United States Patent
Hasegawa et al.

(10) Patent No.: US 9,199,739 B2
(45) Date of Patent: Dec. 1, 2015

(54) PASSENGER SEAT DEVICE

(75) Inventors: Satoshi Hasegawa, Untergruppenbach (DE); Patrick Barron Sesma, Göttingen (DE)

(73) Assignee: RECARO Aircraft Seating GmbH & Co. KG, Schwäbisch Hall (DE)

( * ) Notice: Subject to any disclaimer, the term of this patent is extended or adjusted under 35 U.S.C. 154(b) by 1236 days.

(21) Appl. No.: 13/124,457

(22) PCT Filed: Oct. 8, 2009

(86) PCT No.: PCT/EP2009/007245
§ 371 (c)(1),
(2), (4) Date: Sep. 29, 2011

(87) PCT Pub. No.: WO2010/043341
PCT Pub. Date: Apr. 22, 2010

(65) Prior Publication Data
US 2012/0012708 A1    Jan. 19, 2012

(30) Foreign Application Priority Data
Oct. 18, 2008 (DE) .......................... 10 2008 052 296

(51) Int. Cl.
*B64D 11/06* (2006.01)
*G09F 21/06* (2006.01)
*G09F 3/20* (2006.01)

(52) U.S. Cl.
CPC ............ *B64D 11/06* (2013.01); *B64D 11/0638* (2014.12); *G09F 3/20* (2013.01); *G09F 21/06* (2013.01); *Y02T 50/46* (2013.01)

(58) Field of Classification Search
CPC .................. B64D 2011/0679; G09F 21/06
USPC ............... 244/118.6; 40/124.06, 606.17; 297/188.04; 108/50.11
See application file for complete search history.

(56) References Cited

U.S. PATENT DOCUMENTS

| 5,720,515 | A |  | 2/1998 | Haffner |
| 6,592,179 | B1 | * | 7/2003 | Miyazaki ...................... 297/146 |
| 6,899,391 | B1 | * | 5/2005 | Schneller et al. ............. 297/252 |
| 7,971,929 | B2 | * | 7/2011 | Kennard et al. ............... 297/146 |
| 2002/0047294 | A1 | * | 4/2002 | Ellinidis et al. .......... 297/188.04 |
| 2002/0066393 | A1 |  | 6/2002 | Strode et al. |

FOREIGN PATENT DOCUMENTS

DE    21 12 539 A1    3/1972
DE    94 22 200 U1    1/1999
(Continued)

OTHER PUBLICATIONS

English translation of DE 201 13 534 U1, Bader, dated Apr. 4, 2002.*
(Continued)

*Primary Examiner* — Rob Swiatek
(74) *Attorney, Agent, or Firm* — Posz Law Group, PLC

(57) ABSTRACT

A passenger seat device, particularly an airplane passenger seat device, including a visible surface body having a receiving region, which is provided for receiving a replaceable information carrier, and a fastening unit for fastening the information carrier in the receiving region. The fastening unit is provided for uncovered fastening of the information carrier.

18 Claims, 5 Drawing Sheets

(56) References Cited

FOREIGN PATENT DOCUMENTS

DE     201 08 619 U1    12/2001
DE     201 13 534 U1    4/2002

OTHER PUBLICATIONS

International Search Report mailed on Mar. 29, 2010 for the corresponding International patent application No. PCT/EP2009/007245 (English copy enclosed).

German Search Report mailed on Feb. 6, 2009 for the corresponding German patent application No. 10 2008 052 296.1.

Office Action issued on Feb. 6, 2013 by the EPO in corresponding EP Patent Application No. 09 740 266.3-1254 (and partial English translation).

International Preliminary Report on Patentability and Written Opinion of the International Searching Authority mailed Apr. 28, 2011 in corresponding International Patent Application No. PCT/EP2009/007245 (and English translation).

German Search Report dated Feb. 6, 2009 in corresponding DE Patent Application No. 10 2008 052 296.1 (and partial English translation).

* cited by examiner

PASSENGER SEAT DEVICE

CROSS REFERENCE TO RELATED APPLICATIONS

This application is a U.S. national stage application of PCT/EP2009/007245 filed on Oct. 8, 2009, and claims priority to, and incorporates by reference, German patent application No. 10 2008 052 296.1 filed on Oct. 18, 2008.

BACKGROUND

Airplane seats are already known, in which an existing component is used for the purpose of an information display, in particular for advertising purposes. Said component has a receiving region in which an information carrier, for example in the form of an advertising medium, can be placed. In order to secure the advertising medium in the receiving region, a transparent panel covering the advertising medium is fastened to the component.

The invention is based in particular on the object of providing a passenger seat device of the type in question which provides improved properties with regard to simple replacement of an information carrier and a saving on weight.

SUMMARY

The invention is based on a passenger seat device, in particular airplane passenger seat device, with a visible surface body which has a receiving region which is provided for receiving a replaceable information carrier, and with a fastening unit for fastening the information carrier in the receiving region.

It is proposed that the fastening unit is provided for uncovered fastening of the information carrier. This makes it possible to replace the information carrier in a particularly simple manner. In addition, a low number of means for fastening the information carrier can be achieved, thus advantageously making it possible to save on weight.

A "visible surface body" is intended in particular to mean a component of the passenger seat device, which component, in at least one position, forms a visible surface which is visible to a passenger. The visible surface body preferably forms at least a subregion of the rear side of a passenger seat in which the passenger seat device is integrated. The "rear side" of the passenger seat is intended to be understood here as meaning the side facing away from the leaning side of the passenger seat, wherein the leaning side is preferably formed by the front side of a backrest of the passenger seat. In particular, the visible surface faces the rear region of the passenger seat, with the visible surface being visible to a passenger sitting in the rear region. In order to make the visible surface highly visible, the visible surface body advantageously spans at least a predominant part, specifically at least 50%, particularly advantageously at least 75% and preferably at least 85% of the extent of the width of the rear side of the passenger seat. The extent of the width of the rear side is intended here to mean an extent, in particular the maximum extent of the rear side, in a horizontal direction defined with respect to a cabin floor on which the passenger seat stands. The visible surface body is preferably formed by a component of the passenger seat. For example, the visible surface body can be formed by a subregion of a backrest of the passenger seat or can be formed by a body which is connected fixedly or movably to the backrest. In this connection, it is proposed that the visible surface body is designed as a table body. Said table body is mounted pivotably in particular on the backrest and has a side which, in at least one operating position of the table body, forms the visible surface.

The passenger seat device according to the invention is suitable in particular for a thin-walled, sheet-like information carrier, for example a printing medium, which can be composed, for example, of cardboard or plastic. In particular, the information carrier can be produced as per DIN standard B6.

A receiving region which is "provided" for receiving the information carrier is intended to be understood to be a region of the visible surface body, which is specially equipped and/or configured and/or shaped to form a coupling to the information carrier. In particular, the visible surface formed by the visible surface body has a main surface and an outer surface which differs visually from the main surface and, in the fastened state of the information carrier, is covered by the latter. In contrast to a surface which is not provided for coupling to an information carrier, for example a surface on which an information carrier is merely adhesively bonded, a special fitting of this type can result in a secure and visually attractive attachment of the information carrier. This can be achieved in a particularly simple manner if the receiving region is designed as a depression which is integrally formed on the visible surface body.

Throughout the description, "covering" of a component is intended to be understood as meaning a covering with respect to the normal direction to an outer surface of the component, wherein the normal direction points outward or leads away from the component. If the component forms a subregion of the rear side of a passenger seat, then the normal direction points into the rear region of the passenger seat.

A fastening unit which is provided for "uncovered fastening" of the information carrier is intended in particular to mean a fastening unit which secures the information carrier in the receiving region in such a manner that said fastening unit leaves at least a predominant part of an information-carrying side of the information carrier uncovered. A "predominant part" of the information side is intended to be understood as meaning in particular at least 50%, advantageously at least 75% and preferably at least 85% of the entire surface extent of the information side. The information side can additionally be protected by a covering. However, in this case, the information carrier remains fastened captively in the receiving region when the covering is removed.

In a preferred embodiment of the invention, it is proposed that the fastening unit has a fastening means which is formed as a single piece with the visible surface body, thus enabling a particularly simple construction of the passenger seat device to be achieved. If the fastening unit has a plurality of spatially separated fastening means, then all of the fastening means are advantageously formed as a single piece with the visible surface body.

In addition, it is proposed that the fastening unit is provided for producing a positive locking connection to the information carrier, thus making it possible to achieve a particularly simple, in particular tool-free, fastening of the information carrier in the receiving region.

A structurally simple and secure fastening of the information carrier can be achieved if the fastening unit has a fastening means which partially covers the information carrier in order to secure the information carrier.

It is furthermore proposed that, in the fastened state of the information carrier, at least a subsection of a border side of the information carrier engages in the fastening means, thus enabling simple installation of the information carrier to be achieved. In this case, the information carrier in particular has an information side which contains the information to be displayed, and a rear side which is oriented parallel to the information side and, in the fastened state of the information carrier, faces the receiving region. A "border side" of the information carrier forms the circumference of the information side and of the rear side and forms an edge with the latter. For the insertion of a subregion of the border side of a thin-walled printing medium, the fastening means can be designed, for example, as a slot.

In an advantageous embodiment of the invention, it is proposed that the fastening means has a cavity recessed from the visible surface body, thus enabling a simple production method and reliable securing of the information carrier to be achieved. The fastening means is advantageously formed by a cavity. In particular, the cavity can be recessed from the visible surface body by a cutting process or by a milling process. If the receiving region is designed as a recess which is integrally formed on the visible surface body, according to another development of the invention the cavity is advantageously recessed from a wall at least partially bordering the depression.

The information carrier can be highly stable in the receiving region if the fastening unit has fastening means which, in the fastened state of the information carrier, interact with corner regions of the information carrier. For this purpose, the fastening means are advantageously spatially separated from one another in such a manner that they each correspond to a different corner region of the information carrier. If the information carrier is of rectangular design, the receiving region is advantageously likewise of rectangular design, with the fastening means each being arranged in a different corner region, in particular a rounded corner region. A particularly compact design of the fastening unit can furthermore be achieved if the fastening unit has fastening means which are provided for interaction exclusively with corner regions of the information carrier.

In another embodiment, it is proposed that the passenger seat device has a guide channel which traverses the visible surface body and is intended for the insertion of a tool for removing the information carrier, thus enabling particularly simple removal of the information carrier to be achieved, in particular if the guide channel is provided for guiding the tool into a rear region of the information carrier. The guide channel is preferably arranged in a bore recessed from the surface body.

Furthermore, it is proposed that the visible surface body has an outer surface which, in the fastened state, is covered by the information carrier and is used for displaying information.

For the rapid and simple removal of the information carrier from the receiving region, a passenger seat device accessory part for use with the passenger seat device according to the invention is proposed, which accessory part is provided for removing the information carrier from the visible surface body. In a particularly simple embodiment, the passenger seat device accessory part is designed as a spatula unit.

DRAWING

Further advantages emerge from the description below of the drawing. The drawing illustrates an exemplary embodiment of the invention. The description and the claims contain numerous features in combination. A person skilled in the art will expediently also consider the features individually and put said features together to form meaningful further combinations.

DETAILED DESCRIPTION OF THE PREFERRED EMBODIMENTS

Figure 1:
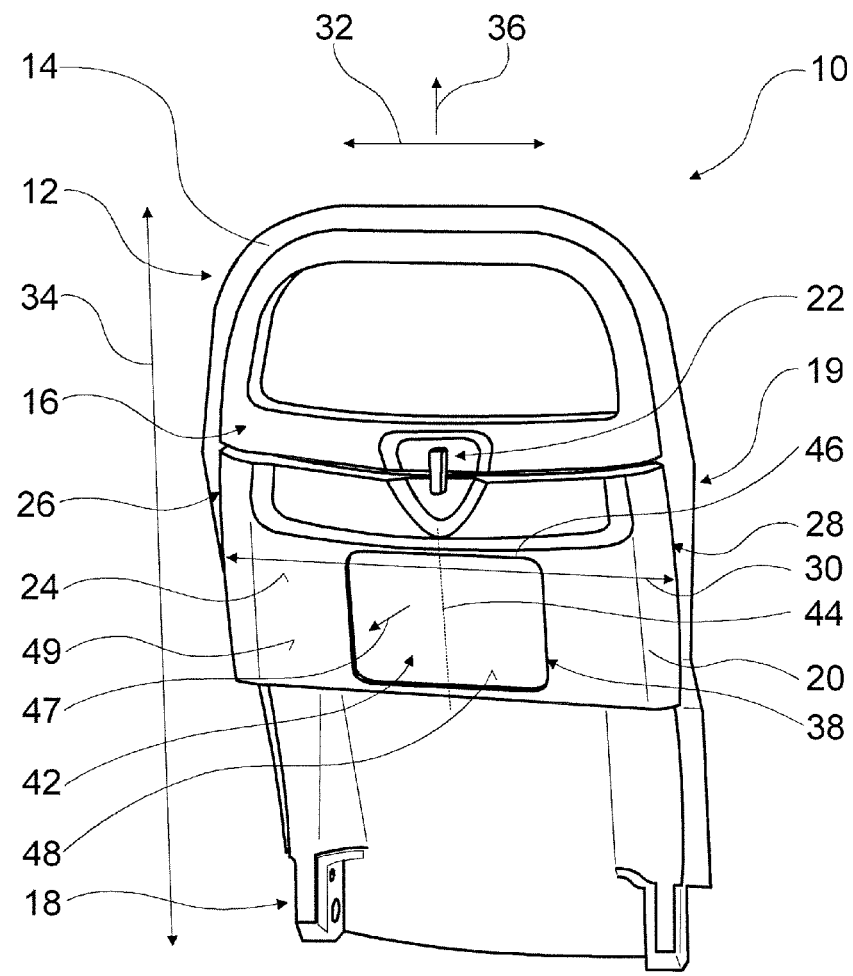
FIG. 1 is a subregion of a backrest of an airplane seat with a pivotable table body, in a view from the rear.

FIG. 1 shows, in a perspective view from the rear, a subregion of a passenger seat which, for the sake of clarity, is not shown entirely and is designed as an airplane seat 10. The airplane seat 10 has a backrest 12 with a backrest structure 14 which, in the fitted state of the airplane seat 10, is covered on its front side (not visible in the figure) from the front with upholstery (not illustrated specifically). The figure shows the rear side of the backrest 12, which rear side is denoted by the reference signs 16, faces away from the front side, is oriented substantially parallel to said front side and faces a rear region of the airplane seat 10. In the rear region of the airplane seat 10, in particular when the airplane seat 10 is fitted in a row of seats of an airplane cabin, there is another airplane passenger seat arranged behind the airplane seat 10. The rear side 16 is visible to a passenger sitting in the rear region of the airplane passenger seat 10 and components of the backrest 12 forming the rear side 16 can be used by said passenger for various purposes. In the fitted state of the airplane seat 10, the backrest structure 14 is mounted fixedly and/or pivotably by means of a fastening unit 18 to a supporting frame for mounting the airplane seat 10 on a cabin floor and/or on a seat part.

A passenger seat device 19 which is designed as an airplane passenger seat device is arranged on the backrest 12. The passenger seat device 19 has a visible surface body 20 which is designed as a table body and is fastened pivotably to the backrest 12 by means of a bearing unit (not described specifically). The visible surface body 20 can be pivoted from a stowed position (shown in FIG. 1), in which said visible surface body is folded up on the backrest 12, into a substantially horizontal, folded down use position (not shown in the figures) by a passenger sitting in the rear region of the airplane seat 10. In the stowed position, the visible surface body 20 is held on the backrest 12 by means of a locking device 22 which is fastened to the backrest structure 14. The function of the visible surface body 20, for example as an eating table, and the mounting thereof on the backrest 12 are known from the prior art and are not explained in more detail in this description.

In the stowed position thereof, the visible surface body 20 forms a visible surface 24 which is part of the rear side 16 and accordingly faces the rear region of the airplane seat 10. In the stowed position and when the backrest 12 is in an upright position relative to a cabin floor, the visible surface 24 is substantially vertical relative to the cabin floor. The visible surface 24 extends—in a horizontal direction 32 which is defined with respect to the airplane cabin floor and is oriented parallel to said cabin floor—from a vertical edge region 26 as far as a vertical edge region 28 of the backrest 12, which edge region is opposite the edge region 26, as a result of which the visible surface 24 extends at least over 50% of the entire width 30 of the rear side 16 of the backrest 12, in this case over the entire width 30. A vertical edge region here corresponds to an edge region which extends in a longitudinal direction 36 of the backrest 12 and, in an upright position of the backrest 12, is oriented substantially vertically relative to the cabin floor. The width 30 of the rear side 16 furthermore corresponds to the entire extent of the rear side 16 in the horizontal direction 32. The visible surface 24 which is formed by the visible surface body 20 has, at least on average, a height which corresponds approx. to one third of the entire height 34 of the rear side 16 of the backrest 12. One height here corresponds to an extent in the longitudinal direction 36 of the backrest 12. In particular, the height 34 of the rear side 16 corresponds to the entire extent of the rear side 16 in the longitudinal direction 36 of the backrest 12. The entire height 34 of the rear side 16 is calculated here from the upper edge of the backrest 12 as far as the fastening unit 18.

In the embodiment shown, the visible surface body 20 is designed as a table body which is mounted movably on the backrest 12, with the passenger seat device 19 being designed as a passenger seat table device. In a further variant embodiment, it is conceivable for the visible surface body 20 to be fastened immovably to the backrest 12. In particular, the visible surface body 20 can be formed as a single piece with the backrest 12. Furthermore, in another embodiment, the visible surface body 20 can be mounted movably or fixedly on a rear surround of an airplane seat, said surround covering the backrest of said airplane seat from the rear, for example in the case of an airplane seat of a more luxurious class of comfort—or said visible surface body may be formed as a single piece with said surround.

Figure 2:
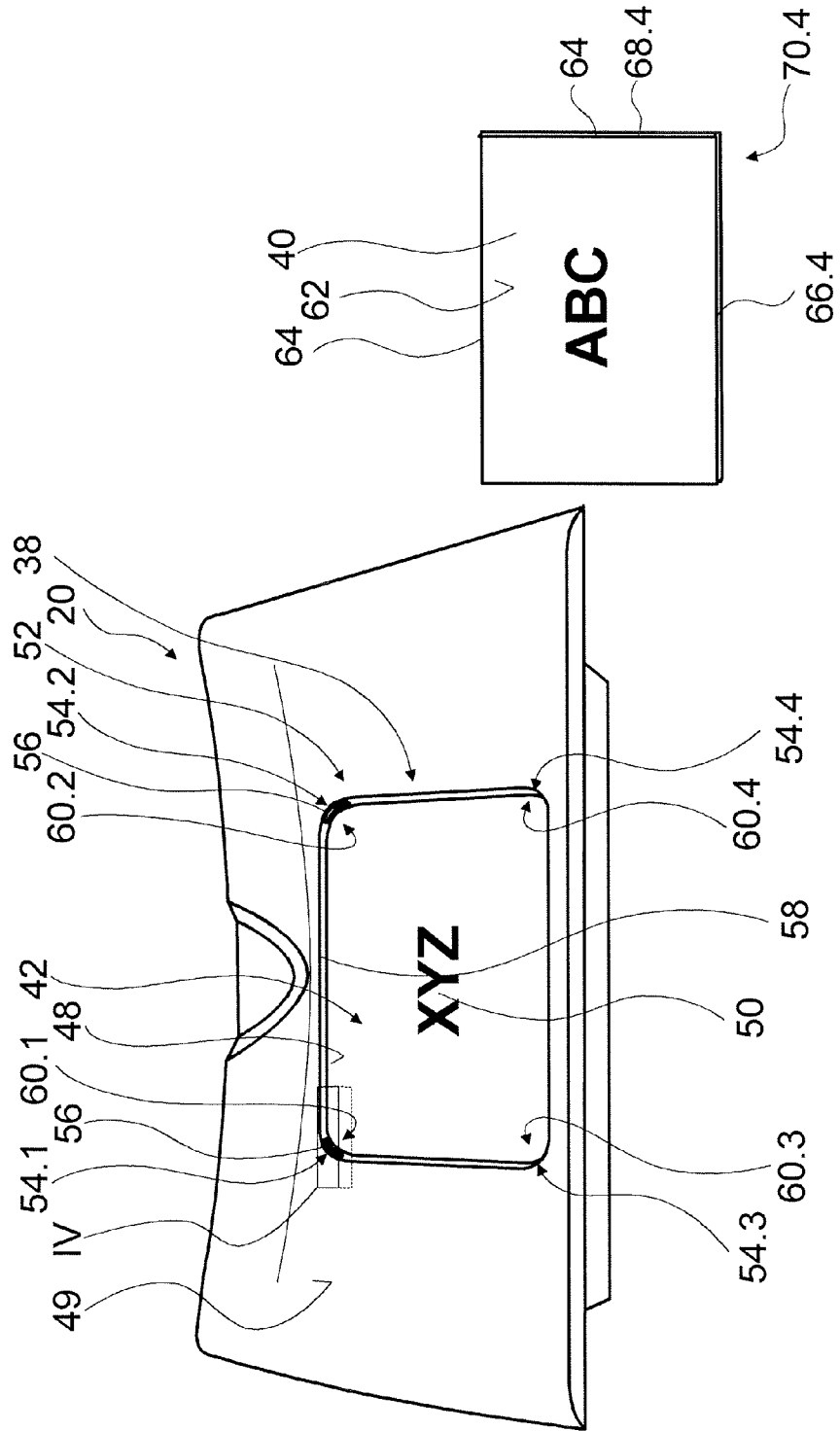
FIG. 2 is a perspective view of the table body with a receiving region for an information carrier which is illustrated next to the table body.

The visible surface body 20 furthermore has a receiving region 38 which is provided for receiving a replaceable information carrier 40 (FIG. 2). The receiving region is designed as a depression 42 in the visible surface body 20. The receiving region 38 is configured in the form of a rectangle, in particular with rounded corners, wherein the longitudinal extent of the rectangle is oriented in the horizontal direction 32. It is arranged on that side of the visible surface body 20 which, in the stowed position of said visible surface body, faces the rear region of the airplane seat 10. In said stowed position, the receiving region 38 accordingly forms part of the rear side 16 of the backrest 12. The receiving region 38 is arranged centrally in the visible surface body 20 with respect to the horizontal direction 32. In this case, the median 44 of the visible surface body 20, which median is oriented in the longitudinal direction 36 of the backrest 12, corresponds to the median of the longitudinal sides 46 of the receiving region 38. The depression 42 has an outer surface 48 which corresponds to the base surface of said depression and is arranged at a deeper level than a main surface 49 of the visible surface body 20.

Furthermore, the normal direction 47 to the outer surface 48 is shown, wherein the normal direction 47 points outward or leads away from the passenger seat device 19. Within the context of this description, the normal direction 47 can be used to define the term "covering": "covering" of a component, in particular "covering from the rear" is intended to be understood as meaning covering in the normal direction 47. In the present example, the visible surface body 20 forms part of the rear side 16 of the airplane seat 10, and therefore the normal direction 47 points into the rear region of the airplane seat 10. In particular, in the present exemplary embodiment, the normal direction 47 is oriented counter to a flying direction.

FIG. 2 shows the visible surface body 20, which is designed as a table body, in a state separated from the backrest 12. The information carrier 40 is illustrated next to the visible surface body 20. The difference in depth between the outer surface 48 and the main surface of the visible surface body 20 is achieved in particular by means of deep drawing the main surface 49. By this means, the main surface 49 and the outer surface 48 which is arranged at a deeper level are formed as a single piece with each other. In the fastened state of the information carrier 40 (FIG. 5), the outer surface 48 is covered from the rear by the information carrier 40. The outer surface 48 is used as an information carrier, by means of which information, in particular in the form of an imprint 50, for example as a company logo, is displayed when the information carrier 40 is removed. The imprint 50 may be printed on the outer surface 48 or may be stuck to said outer surface 48.

The passenger seat device 19 furthermore comprises a fastening unit 52 which is provided for fastening the information carrier 40 in the receiving region 38. According to the invention, the fastening unit 52 is provided for uncovered fastening of the replaceable information carrier 40 in the receiving region 38. For this purpose, the fastening unit 52 has fastening means 54.1 to 54.4 which each form an intersection for direct coupling to the information carrier 40.

Figure 3:
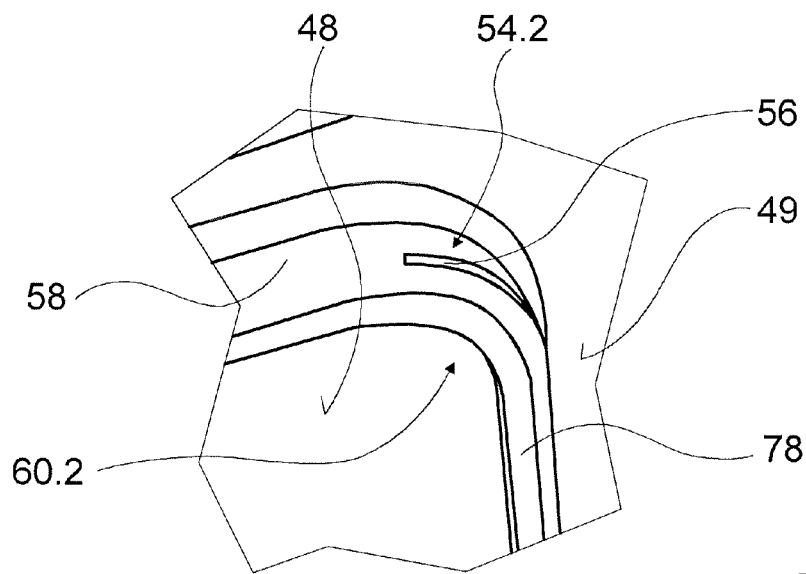
FIG. 3 is a detailed view of a fastening unit for fastening the information carrier in the receiving region.

The fastening means 54.1 to 54.4 are each designed as a cavity 56 recessed from the visible surface body 20. The cavities 56 are each recessed from a wall 58 which completely surrounds the base surface of the depression 42 and forms a stepped transition between the main surface 49 and the outer surface 48 of the visible surface body 20 (also see FIG. 4). The main surface 49, the wall 58 and the outer surface 48 are connected to one another as a single piece. The fastening means 54.1 to 54.4 are accordingly formed as a single piece with the visible surface body 20. The fastening means 54.1 to 54.4 are each arranged in one of the corner regions 60.1 to 60.4 of the rectangular receiving region 38, as a result of which said fastening means are arranged symmetrically in pairs with respect to the median of the rectangle corresponding to the receiving region 38. The cavities 56 are each recessed from a rounded corner region of the wall 58. Said rounded corner region connects, in particular as a single piece, two mutually perpendicular sections of the wall 58. This can be gathered in particular from a detailed view, which is shown in FIG. 3, of the corner region 60.2 of the receiving region 38.

The information carrier 40 which is preferably designed in the form of a rectangle has an information side 62, on which the information items to be displayed are applied and which, in the fastened state of the information carrier 40 and in the stowed position of the visible surface body 20, faces the rear region of the airplane seat 10, a rear side (not visible in the figures) which is opposite the information side 62 and, in the fastened state, faces the outer surface 48 of the depression 42, and a border side 64 which borders the information side 62 and forms an edge with the information side 62 and the rear side. The border side 64 has subsections 66.4 and 68.4 which are perpendicular to each other and thereby form a corner region 70.4 of the information carrier 40. Further subsections form further corner regions (not shown in the figure for the sake of clarity) with further subsections which are each perpendicular to the other subsections. The information carrier is preferably designed as advertising material corresponding to DIN standard B6.

By means of the arrangement of each fastening means 54.1 to 54.4 in a respective corner region 60.4 of the receiving region 38, said fastening means are designed to interact with the corner regions 70.4 of the information carrier 40 in the fastened state of the information carrier 40. During fastening of the information carrier 40, the corner regions 70.4 thereof are inserted into the corresponding fastening means 54.1 to 54.4. Accordingly, in the fastened state of the information carrier 40, the subsections 66, 68 of the border side 64 of the information carrier 40 each engage in the corresponding fastening means 54. In the fastened state, the corner regions 70 of the information carrier 40 are covered from the rear by the corresponding fastening means 54 so as to be able to prevent the information carrier 40 from dropping out into the rear region of the airplane seat 10.

By means of the selected arrangement of the fastening means 54.1 to 54.4, the information carrier 40 is secured in the receiving region 38 exclusively by the action of said fastening means 54.1 to 54.4, and therefore the use of further fastening means for securing the information carrier 40 in the receiving region 38 can be dispensed with. In a particularly advantageous manner, the information carrier 40 is held uncovered in the receiving region 38 by the fastening unit 52 with the fastening means 54.1 to 54.4. In this case, the contact between the information carrier 40 and the fastening unit 52 is limited to the corner regions 70.4 of the information carrier 40, and therefore a substantial part of the information side 62, in the present case more than 75% of the information side 62, is left free by the fastening unit 52. In order to protect the information carrier 40, at least the information side 62 can have a protective means, in particular a protective means which cannot be written on, for example a protective film.

By means of the above-described configuration and arrangement of the fastening means 54.1 to 54.4, the information carrier 40 is secured in the receiving region 38 by production of a positive locking connection to the fastening unit 52, as a result of which the information carrier 40 can be fastened in the receiving region 38 without a tool. In order to produce the positive locking connection, the dimension of the information carrier 40 is selected such that the surface extent of the information carrier 40 is larger than the surface extent of the depression 42, with the excess size corresponding to the corner regions 70.1 to 70.4 which, in the fastened state of the information carrier 40, engage in the fastening means 54.1 to 54.4. The information carrier 40 can thereby be secured in the receiving region 38 without any play.

In an alternative embodiment of the invention, the fastening unit 52 can have fastening means which are produced separately from the visible surface body 20 and, in the fitted state, are fastened to the visible surface body 20. Upon attachment and removal of the information carrier 40, said fastening means remain fixed to the visible surface body 20. For example, it is conceivable for fastening means of this type to be fastened in the cavities 56.

Figure 4:
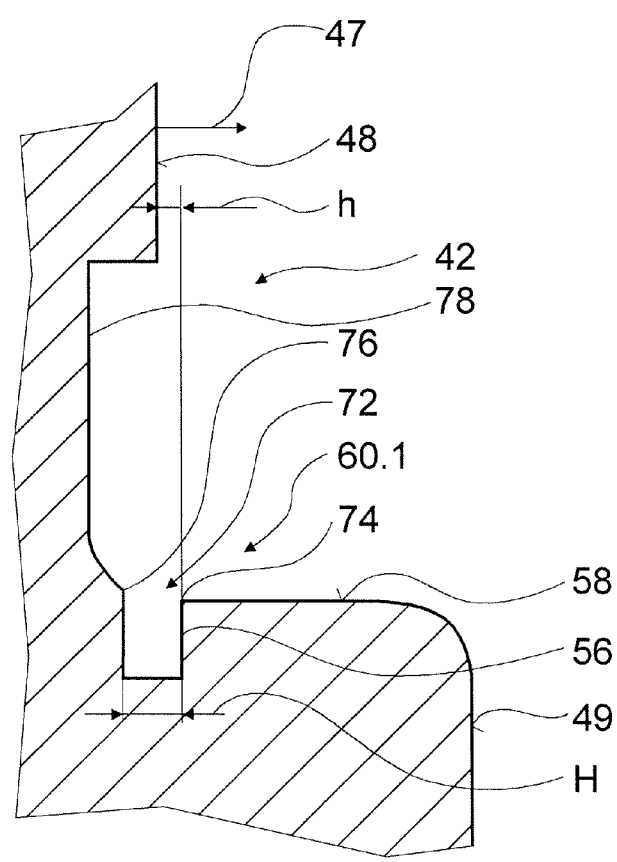
FIG. 4 is a sectional view of the table body.

FIG. 4 shows a sectional view of the visible surface body 20 according to the plane IV shown in FIG. 2. The main surface 49 and the outer surface 48 corresponding to the base surface of the depression 42 can be seen. Said surfaces are connected to each other by the wall 58. A cavity 56 is recessed from the wall 58 in the corner region 60.1 of the receiving region 38. The cavity 56 can be produced, for example, by means of a milling process. Said cavity has an opening 72 which has a height H with respect to the normal direction 47. For example, the height H is approx. 2 mm. The height H corresponds to the distance along the normal direction 47 between a first opening border 74 and a second, deeper opening border 76 of the opening 72. The deep opening border 74 adjoins a subregion 78 of the depression 42, which subregion is arranged at a deeper level than the outer surface 48. Accordingly, between the first opening border 74 and the outer surface 48 of the depression 42 there is a distance h with respect to the normal direction 47, which distance is smaller than the height H. An information carrier can accordingly be placed into the cavity 56 which has a thickness which corresponds at maximum to the distance h. In the present example, the distance h is approx. 0.5 mm.

Figure 5:
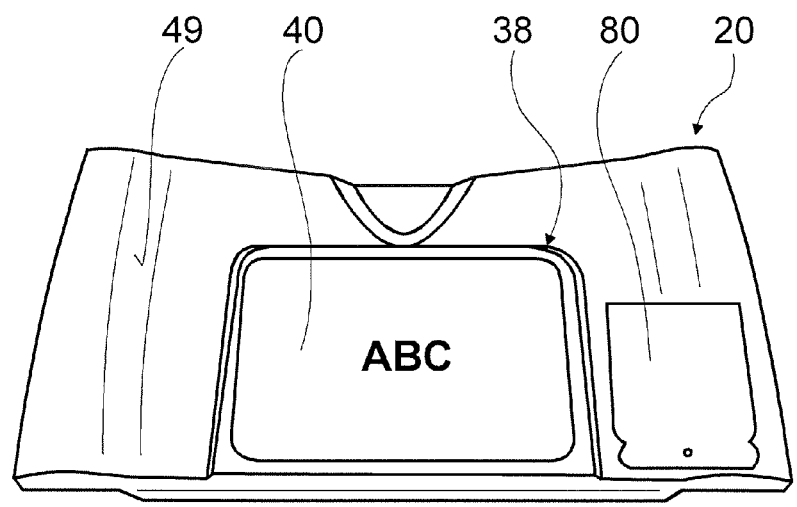
FIG. 5 is the table body in the fastened state of the information carrier and an accessory part for removing the information carrier.
Figure 6:
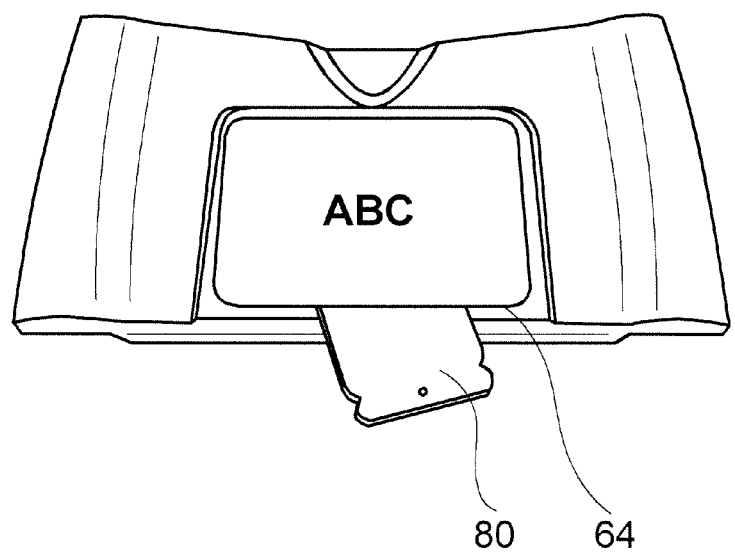
FIG. 6 is the table body in an operation with the accessory part.

The operation to remove the information carrier 40 from the receiving region 38 is illustrated with reference to FIGS. 5 and 6. FIG. 5 shows the visible surface body 20, which is designed as a table body, in the fastened state of the information carrier 40. In this state, the information carrier 40 completely covers the outer surface 48, i.e. the bottom surface of the depression 42.

In order to remove the information carrier 40 from the receiving region 38, an accessory part in the form of a spatula unit 80 is provided for the passenger seat device 19. As FIG. 6 shows, during the removal operation, the accessory part is inserted between the wall 58 of the depression 42 and the border side 64 of the information carrier 40. By means of a lever movement of the accessory part, said movement being supported on the main surface 49, the information carrier 40 can be bent upward, with the corner regions 70.4 thereof being guided out of the cavities 56.1 to 56.4.

Figure 7:
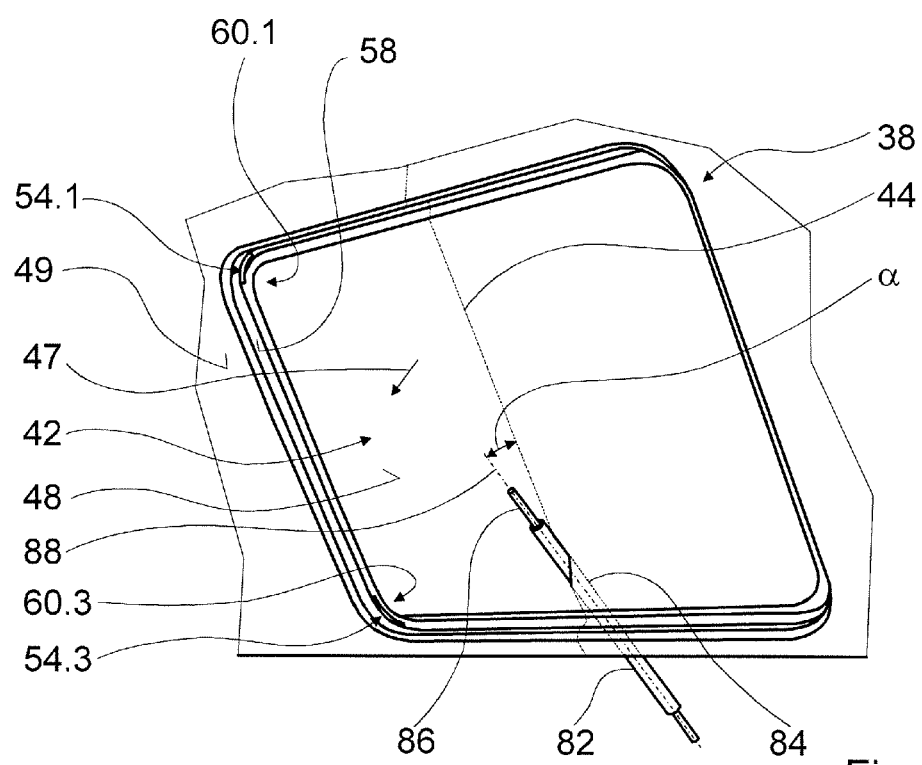
FIG. 7 is the table body with a guide channel for guiding a tool for removal of the information carrier.

As an alternative or in addition, a further device for removing the information carrier 40 can be provided, which device is illustrated in FIG. 7. In this embodiment, the passenger seat device 19 has a guide channel 82 which is provided for inserting a tool for removal of the information carrier 40. The guide channel 82 is arranged in a bore 84 recessed from the visible surface body 20. Said guide channel is arranged in such a manner that a tool 86 guided therein is guided as far as the rear side of the information carrier 40. By means of a movement of the tool 86 in the guide channel 82, said tool can be guided until bearing against the rear side of the information carrier 40. If the movement is continued, the information carrier 40 can be bent from the rear until the corner regions 70.4 of the information carrier 40 are moved out of the fastening means 54.1 to 54.4. The bore 84 and, as a result, the guide channel 82 have a longitudinal direction 88 which is arranged obliquely relative to the outer surface 48, i.e. to the base surface of the depression 42. In particular, said longitudinal direction 88 forms an acute angle $\alpha$, in particular an angle $\alpha$ of approx. 20°, with the median 44 of the receiving region 38, which median extends upward in the longitudinal direction 36 of the backrest 12.

The invention claimed is:

1. An airplane passenger seat device, comprising:
   a replaceable information carrier,
   a table body, including
   a visible surface body having a receiving region which is provided for receiving the replaceable information carrier, and
   a fastening unit for fastening the information carrier in the receiving region, wherein
   the fastening unit secures the information carrier in the receiving region so that at least a predominant portion of an information-carrying side of the information carrier remains uncovered and exposed,
   the fastening unit includes a fastener which partially covers the information carrier in order to hold the information carrier, and
   in a fastened state of the information carrier, at least a subsection of a border side of the information carrier engages in the fastening unit.

2. The airplane passenger seat device as claimed in claim 1, wherein the receiving region is designed as a depression which is integrally formed on the visible surface body.

3. The airplane passenger seat device as claimed in claim 2, wherein a cavity is recessed from a wall at least partially bordering the depression.

4. The airplane passenger seat device as claimed in claim 1, wherein the fastening unit includes a fastener formed as a single piece with the visible surface body.

5. The airplane passenger seat device as claimed in claim 1, wherein the fastening unit is provided for producing a positive locking connection with the information carrier.

6. The airplane passenger seat device as claimed in claim 1, further comprising a guide channel which traverses the visible surface body and is intended for the insertion of a tool for removing the information carrier.

7. The airplane passenger seat device as claimed in claim 1, further comprising an accessory part provided for removing the information carrier from the visible surface body.

8. The airplane passenger seat device accessory part as claimed in claim 7, wherein the accessory part is designed as a spatula unit.

9. A system with an airplane passenger seat device as claimed in claim 1 and the information carrier is provided to be received in the receiving region of the visible surface body.

10. The airplane passenger seat device as claimed in claim 1, wherein the fastener includes a cavity recessed from the visible surface body.

11. The airplane passenger seat device in claim 1, wherein the fastening unit exclusively secures the information carrier to the receiving region.

12. The airplane passenger seat device in claim 1, wherein the fastening unit further comprises a cavity that is recessed from the visible surface body, and that has a width defined by a first opening border and a second opening border, wherein
   the receiving region has an outer surface, and
   the width of the cavity is larger than a width between the first opening border and the outer surface.

13. An airplane passenger seat device, comprising:
   a visible surface body having a receiving region which is provided for receiving a replaceable information carrier, and
   a fastening unit for fastening the information carrier in the receiving region, wherein
   the fastening unit secures the information carrier in the receiving region so that at least a predominant part of an information-carrying side of the information carrier remains uncovered and exposed,
   the receiving region comprises a depression that is integrally formed on the visible surface body and that defines a cavity located at the bottom of the depression and recessed from a horizontal surface body wall at least partially bordering the depression, and
   the fastening unit includes at least one fastener which, in a fastened state of the information carrier, interacts with corner regions of the information carrier.

14. The airplane passenger seat device in claim 13, wherein the cavity extends outwardly from a vertical surface body wall farther than the depression.

15. An airplane passenger seat device, comprising:
   a visible surface body having a receiving region which is provided for receiving a replaceable information carrier, and
   a fastening unit for fastening the information carrier in the receiving region,
   the fastening unit secures the information carrier in the receiving region so that at least a predominant part of an information-carrying side of the information carrier remains uncovered,
   the fastening unit has at least one fastener that partially covers the information carrier in order to hold the information carrier, that includes a cavity recessed from the visible surface body, and that interacts with corner regions of the information carrier in a fastened state of the information carrier, and
   the receiving region comprises a depression that is integrally formed on the visible surface body and that defines a cavity located at the bottom of the depression and recessed from a horizontal surface body wall at least partially bordering the depression.

16. The airplane passenger seat device in claim 15, wherein the cavity extends outwardly from a vertical surface body wall farther than the depression.

17. An airplane passenger seat device, comprising:
   a replaceable information carrier,
   a table body, including
      a visible surface body having a receiving region which is provided for receiving a replaceable information carrier, and
      a fastening unit for fastening the information carrier in the receiving region, wherein the fastening unit secures the information carrier in the receiving region so that at least a predominant portion of an information-carrying side of the information carrier remains uncovered and exposed, wherein
   the fastening unit includes a fastener which partially covers the information carrier in order to hold the information carrier, and
   the fastener has a cavity recessed from the visible surface body.

18. An airplane passenger seat device, comprising:
   a replaceable information carrier,
   a table body, including
      a visible surface body having a receiving region which is provided for receiving a replaceable information carrier, and
      a fastening unit for fastening the information carrier in the receiving region, wherein the fastening unit secures the information carrier in the receiving region so that at least a predominant portion of an information-carrying side of the information carrier remains uncovered and exposed, and wherein
   the fastening unit includes a fastener which, in the fastened state of the information carrier, interacts with corner regions of the information carrier.

* * * * *